(12) United States Patent
Li

(10) Patent No.: US 6,361,009 B1
(45) Date of Patent: Mar. 26, 2002

(54) COMPARTMENT MOUNTED AUTOMOTIVE BEVERAGE CONTAINER HOLDER

(76) Inventor: Bernard A. Li, P.O. Box 8705, Rancho Santa Fe, CA (US) 92067

( * ) Notice: Subject to any disclaimer, the term of this patent is extended or adjusted under 35 U.S.C. 154(b) by 0 days.

(21) Appl. No.: 09/469,938

(22) Filed: Dec. 21, 1999

(51) Int. Cl.[7] .................................................. A47K 1/08
(52) U.S. Cl. ..................................... 248/311.2; 248/314
(58) Field of Search ............................. 248/311.2, 310, 248/314, 315, 309.1, 912; 224/926

(56) References Cited

U.S. PATENT DOCUMENTS

| | | | |
|---|---|---|---|
| D228,304 S | 9/1973 | Lerew et al. | |
| 4,183,226 A | * 1/1980 | Moore | 62/457 |
| D265,351 S | 7/1982 | Wooters | |
| D279,235 S | 6/1985 | Langland | |
| D287,789 S | 1/1987 | Johnson | |
| 4,721,216 A | 1/1988 | Kinder | |
| D295,709 S | 5/1988 | Evans et al. | |
| 4,844,400 A | 7/1989 | Jasmagy, Jr. | |
| 4,974,741 A | * 12/1990 | Gustafson et al. | 220/85 H |
| D331,175 S | 11/1992 | Jones et al. | |
| 5,174,534 A | * 12/1992 | Mitchell | 248/311.2 |
| 5,224,679 A | * 7/1993 | Code | 248/314 |
| 5,282,598 A | 2/1994 | Greene | 248/311.2 |
| 5,356,107 A | * 10/1994 | Sinohuiz | 248/311.2 |
| D358,967 S | 6/1995 | Knighton | |
| 5,624,404 A | * 4/1997 | Fisler | 604/187 |
| D380,650 S | * 7/1997 | Norris | D7/619 |
| 5,676,340 A | * 10/1997 | Ruhnau | 248/311.2 |
| 5,709,105 A | * 1/1998 | Palermo | 62/457.4 |
| 5,720,458 A | 2/1998 | Carpenter | 248/205.1 |
| D391,452 S | 3/1998 | Huebert | |
| 5,730,522 A | 3/1998 | Wyke et al. | 362/432 |
| D398,127 S | 9/1998 | Bergin et al. | |

* cited by examiner

*Primary Examiner*—Anita King
*Assistant Examiner*—Gwendolyn Baxter
(74) *Attorney, Agent, or Firm*—Fulwider Patton Lee & Utecht, LLP

(57) ABSTRACT

A beverage container holder formed with an upright body configured with an open cavity and includes a downwardly projecting stem configured to complementally fit the cross on of a car door pocket or center console opening.

21 Claims, 1 Drawing Sheet

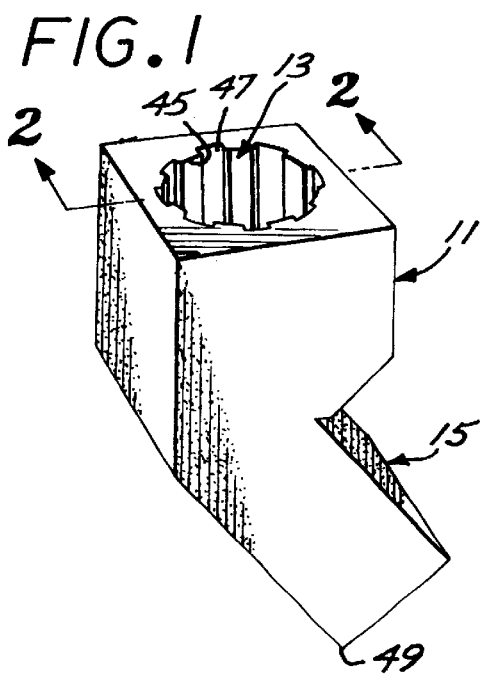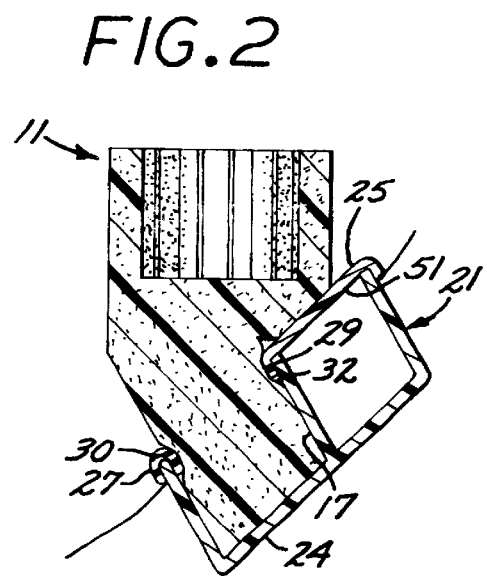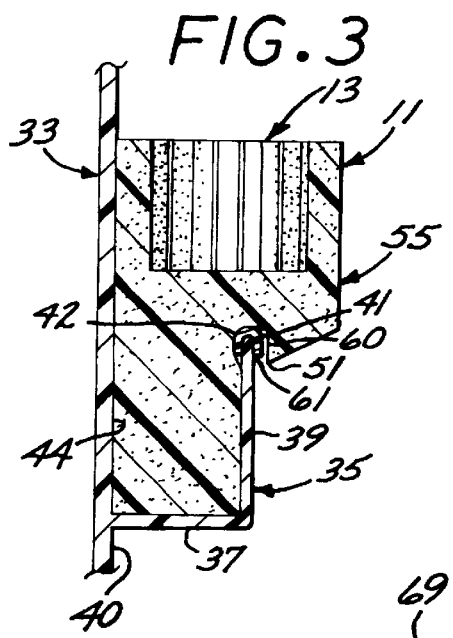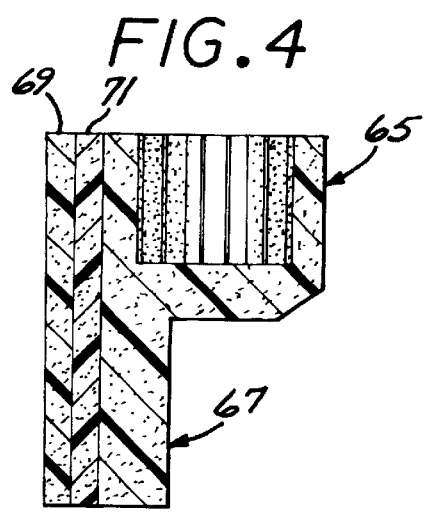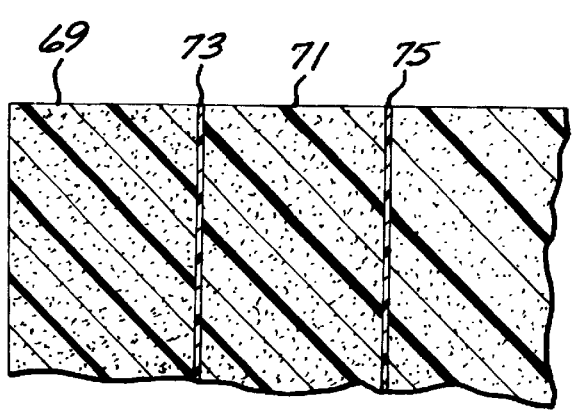

COMPARTMENT MOUNTED AUTOMOTIVE BEVERAGE CONTAINER HOLDER

FIELD OF THE INVENTION

The present invention relates to portable devices mountable in an interior automotive compartment for holding beverage containers.

DESCRIPTION OF THE PRIOR ART

Those who commute by automobile often prefer the benefit of carrying a beverage, such as hot coffee, a soda or lemonade, with them during their travels to both maintain their hydration and interrupt the monotony of travel. In recognition of this desire, many efforts have been made throughout the years to provide a satisfactory beverage container for use by the commuter. Examples include trays to straddle the center console of an automobile and configured with upwardly opening openings for receipt of a cup, glass or bottle. Other efforts have led to the provision of covered cups or containers configured with openable discharge ports through which the hydrating liquid can be drawn. Many commuters, however, prefer a holder which will conveniently receive a cup or bottle into which the liquid is originally dispensed or stored. Some holders have been proposed which are in the form of a thermally insulative holder which telescopes over the exterior of a cup or bottle to be grasped by the user and to insulate the beverage so as to maintain its temperature. These devices, however, are not typically stable for holding the beverage in a stable position. Thus the driver or passenger is forced to incur the risk of securing the holder in his or her lap. Such a risk can pose great danger to the driver, particularly when hot liquids are contained in the beverage container. This risk is acute when a standard shift automobile is being driven, requiring repeated manipulation of the foot and knees of the operator. In recognition of these shortcomings, holders have been proposed configured with a particular wedge shape so as to be complementally received between the legs of a driver and configured on its bottom with an upwardly and forwardly sloping surface to complement the typical upward and forward slope of an automotive seat. A device of this type is shown in U.S. Pat. No. 4,721,216 to Kinder. Such devices, while providing some stability for the holder, are not totally satisfactory since the driver must concentrate on holder his or her legs still and in a particular position to safely hold a cup against tilting which may cause spillage of the contained hot coffee or the like.

Other drink container holders have been proposed which includes a ring suspended from a pliable hanger which may be bent to different positions for hanging over differently shaped objects, such as the side window glass of an automobile. A device of this type is shown in U.S. Pat. No. 4,844,400 to Jasmagy, Jr. These devices have not enjoyed particular commercial success since their successful use is dependent on locating an object in an automobile which is properly shaped for receipt of the hanger and which is located for convenient access of the beverage by the driver or passenger.

Other efforts to provide a stabilized beverage container holder have led to the proposal of a cylindrical tube configured with a tongue projecting laterally from its bottom wall to be releasably received in the crack formed between the bottom and back of an automobile seat. A device of this type is shown in U.S. Pat. No. 5,282,598 to Greene. Such devices, while providing some stability, suffer the shortcoming that they are of limited utility at different locations in the passenger cabin and are not practical for use in the front seat when both the driver and passenger seats are occupied.

These needs have been recognized by automotive original equipment manufacturers (OEMs). Many OEMs have manufactured automobile with center consoles or door ledges configured with upwardly opening recesses for complemental receipt of a beverage container, such as a cup. There remains, however, a need for portable holders for automobiles which do not incorporate OEM holders or which do not have them in the location preferred by the automobile owner.

Thus, there exists a need for a portable beverage container which may be securely mounted within the interior of the automobile for positively holder a beverage container in an upright position for easy access by the driver or passenger.

SUMMARY OF THE INVENTION

The present invention is characterized by a beverage container holder having an upright block or body formed with an upwardly opening container-receiving bore and formed with a downwardly projecting stem having a lateral cross-section of a dimension to substantially fill a corresponding dimension in a cavity in the interior of the car, such as an ashtray receiving cavity or side door pocket.

BRIEF DESCRIPTION OF THE DRAWINGS

FIG. 1 is a perspective view of a portable beverage container holder embodying the present invention;

FIG. 2 is a vertical sectional view, in reduced scale, taken along the lines 2—2 of FIG. 1;

FIG. 3 is a sectional view, perpendicular to that of FIG. 2, and showing the holder mounted in the side pocket of an automobile;

FIG. 4 is a vertical sectional view of a second embodiment of the portable beverage container holder of the present invention; and FIG. 5 is a partial sectional view, in enlarged scale, similar to FIG. 4.

DESCRIPTION OF THE PREFERRED EMBODIMENTS

Referring to FIG. 1, a portable beverage container holder of the present invention includes, generally, a upstanding block shaped body 11 formed with an upwardly opening beverage receiving bore 13 and a downwardly projecting elongated rectangular mounting stem 15. As shown in FIG. 2, the stem 15 is formed with a longitudinal width substantially complementing the longitudinal dimension in a console cavity 17 normally utilized to receive a pivotable ashtray, tape decks or compact disks.

It is beneficial that a portable beverage holder be mountable in several different orientations and configurations. It is important that the holder be mounted with some degree of stability and security. It is preferable that the holder be constructed of thermally insulative material so as to insulate the container against exchange of heat from the interior of the automobile.

The holder of the present invention is preferably constructed of a thermo plastic open cell foam. A foamed polyurethane can be utilized of either open or closed cell construction or other insulative materials. Preferably, a thermo plastic foam is employed, which is, to at least some degree compressible in, at least the stem area to be compressed laterally for insertion in a selected compartment and to then inherently flex laterally outwardly against the walls of such compartment to be frictionally held in place. This affords the advantage of a unitary piece providing inexpensive manufacture and structural integrity. The foam, while typically impermeable, may have porosity for insulating purposes.

Different automobiles are formed with different interiors. Some automobiles are formed with a center console configured on the top side with various compartments for receipt of ashtrays, tape decks, compact disks, maps or the like. Such compartments are typically incorporated in a cluster or module, generally designated 21, which would be configured with the upwardly opening rectangular cavity 17. Such a cavity is formed having at least first and second walls spaced apart a predetermined width, and is recessed below an upwardly and forwardly inclined adjacent top wall 25. The console may angle upwardly and forwardly at about 30° to the horizontal with the top wall 25 set at a similar angle. The compartment 25 may angle rearwardly and upwardly at a slight acute angle relative to the bottom wall of the module 21 and is open on its top end. Oftentimes, the compartment 17 is formed around its periphery with a peripheral bead 27 or lip 29.

Many automobiles include side doors, generally designated 33, having side pockets, generally designated 35, hung cantileverally from the interior wall 40 and having a bottom wall 37 and interior vertical pocket wall 39 having an upper edge which may also be covered by a bead 41. Such walls cooperate to form a side pocket cavity 44 that is formed with at least first and second side walls spaced apart a predetermined distance.

The console compartments 17 are typically on the order of 6 to 8 cm in length in the fore and aft directions and about 10 cm wide and about 7 cm deep. The side pockets 35 are typically on the order of about 6 cm wide and 10 to 12 cm deep. It is preferable that the stem 15 be friction fit in at least one transverse dimension in the particular cavity 17 or 44 and there is also some advantage to the bottom end of such stem abutting the bottom wall of the cavity to stabilize the holder and facilitate in supporting the weight of the beverage container and fluid contained therein. Such stem may be formed with a transverse cross section about 10% greater than that of the respective cross section of the compartment into which it will be fitted so that, upon insert, such stem is compressed so the inherent outward flex thereof will tend to hold it frictionally in position. This compressibility may vary from slight to a very substantial amount, it only being important that the walls of the lateral stem closely fit the compartment in at least one lateral dimension to form a frictional fit to thus enhance stability and minimize shifting of such stem during acceleration, deceleration and turning of the automobile.

The body 11 of the holder in the preferred embodiment is square in horizontal cross section and generally rectangular in vertical cross section with the cavity 13 having a major diameter of about 6 centimeters. Preferably, the cavity 13 is configured with vertical ribs 45 separated by vertical grooves to be spaced thereabout to facilitate compression under the force of the side walls of the container to thus facilitate mounting therein of beverage containers of various different diameters and side walls angles defining different frusto conical shapes. In some embodiments, the cavity 13 is itself frusto conical in shape to be formed with downwardly and inwardly sloped side walls.

Referring to FIG. 2, in one plane, the stem 15 angles downwardly and forwardly at an acute angle to the central axis of the container cavity 13 to complement the upwardly projecting angle of the console compartment 17 so that, when inserted therein, the body 11 will be held in its upright position. The stem is 6.5 cm wide in that longitudinal dimension to be compressed down to about 6 cm upon insertion to establish a close fit relationship between the front and back walls of such compartment 17. As will be noted, the back and front walls of such stem are compressible so that, upon insertion, they will be compressed on the back side by the bead 27 to form a horizontal groove 30 and on the front side by the lip 29 to form a horizontal groove 32 to thus enhance the gripping force applied to such stem. The bottom surface of such stem is cut in the fore/aft plane to angle upwardly and forwardly at about 30° to the horizontal to thus complement the bottom wall 24 of such compartment 17 so as to add stability to the mounting thereof.

In the plane transverse to the automobile in which the holder is mounted, the stem projects vertically downwardly, as shown in FIG. 3, and is configured with a lateral dimension of 7 cm to establish a close fit relationship in the pocket compartment 44 upon installation. Preferably, the bottom corner 49 of such stem projects transversely along a horizontal transverse line and the stem itself is about 10 cm long to thus cause such bottom corner 49 to abut the bottom wall 37 of the compartment 44 to thus afford additional vertical support for the holder.

In the preferred embodiment, additional stability is afforded the holder, both when mounted in the console module 21 and when mounted in the side pocket 35. To this end, the body 11 (FIG. 2) is formed at its lower forward corner with a stabilizer formed by an upwardly and forwardly projecting chamfer surface 51 which angles upwardly and forwardly at about 45° to the vertical axis of the beverage container cavity 13. This angle serves to complementally contact the top side of the wall 25 on the forward side of the cavity 17 for abutting engagement therewith to enhance the stability of the holder as mounted.

With respect to the side pocket 35, it will be appreciated that the body 11 projects laterally inwardly from the innermost wall of the stem to mount such body positioned almost centrally over the interior pocket wall 39. Such body is formed on its bottom side with a longitudinally projecting hanger, generally designated 55, formed by a downwardly projecting foam plate defining a hook 57 which cooperates in forming a longitudinally projecting, downwardly opening groove 61 that essentially hooks over the bead 41 formed on the top marginal edge of the interior wall 39 of the compartment 35. The compressibility of the foam constructing the stem and hook will facilitate flexing to accommodate different dimension compartments and thickness of interior compartment wall 39. This thus provides additional support directly under the container cavity 13 and the forward/aft horizontally extending top wall of such grooves affords stability against fore and aft rocking of the holder while the overhanging hook 57 serves to provide lateral support.

In operation, it will be appreciated that the holder 11 may be packaged in the normal peg hanger or vacuum packed packaging and can be purchased in the typical automotive outlet store, gas station or coffee shop. The user can store a selected number of such holders in the automobile trunk or other convenient location for use as desired. In the morning commute when, for instance, a coffee purchase is made, the holder may be withdrawn from its stored location and the driver or passenger will select the location where it is to be mounted. In the case of center console mounting, the holder may be oriented with the stem projecting downwardly and forwardly, as shown in FIG. 2, and, while grasping the body 11, the stem may be driven down into the compartment 17. It will be appreciated that any removable structure otherwise located in such compartment 17, such as an ashtray or the like, will have been removed ahead of time. With the stem 15 firmly inserted in the compartment 17, the forward and rearward walls thereof will be in firm contact with the forward and rearward walls of such compartment. Moreover, the bead 27 and lip 29 will serve to compress such forward and rearward walls inwardly and forming respective compressed grooves 30 and 32 on the respective rearward and forward walls thereof to facilitate gripping of such stem for preventing unwanted dislodgement thereof from the cavity 17.

In those compartments 17 having a depth equal to or less than the length of the stem, the bottom surface of such stem will be in contact with the bottom wall 24 of the compartment to provide additional support. Additionally, in those compartments where the top wall 25 of the module is so oriented as to be in contact with the stabilizer chamber surface 51, additional support will be afforded thereby, particularly when the automobile is decelerating. Thus, the container cavity 13 will be held in a vertical orientation for convenient and reliable holding of the container. For oversized containers, as the container is inserted in the compartment, the respective vertical ribs 45 will be compressed outwardly to allow the container to be received in such cavity. Then, when the automobile is underway, the holder will hold the container firmly in its upright position, both during acceleration and deceleration and during right and left hand turns. The beverage in such container will be insulated around the walls thereof against the temperature differential within the cabin of the vehicle. The stagnant air trapped in the respective grooves 47 of the cavity 13 will enhance the insulative characteristics of the subject holder.

In other instances, where the driver or passenger prefers to mount the container from a side pocket 35, the holder may be oriented with the overhang defining the hook 57 disposed toward the interior of the passenger compartment. The holder may be positioned against the interior side wall of the door 33 and the stem 15 compressed laterally and driven downwardly into the pocket compartment 44 with the straight, flat laterally outwardly facing vertical wall thereof firmly supported against the door interior wall 40. In those instances where the width of the pocket compartment 40 is less than the width of the stem, the bead 41 along the top edge of the pocket wall 39 will serve to compress the interior side of such stem inwardly to form the retainer groove 47 thus providing enhanced frictional gripping of the stem. Moreover, the bead 41 will be received in the groove 60 behind the hook 57 and will be configured such that the stabilizing top edge of such bead 41 will abut the top wall of such groove along the longitudinal surface thereof to afford additional support against forward and rearward rocking of the holder within such compartment. It is noted that the container-receiving bore 13 is located nearly centered above the pocket wall 39 so that the weight of the beverage will essentially be supported vertically above such wall to thus enhance stability. Finally, in those compartments 44 having a depth complementing that of the length of the stem 15 or greater, the bottom corner 49 of the stem will abut the bottom wall 37 and provide additional vertical support for the container within the cavity 13.

Referring to FIGS. 4 and 5, the embodiment shown therein includes, generally, a body 65 and a stem device 67 including a plurality of removable compressible spacers 69 and 71. The spacers 69 and 71 include interposed therebetween self-adhesive layers 73 and 75 for selective removal thereof such as to afford different widths of the stem device for accommodating different lateral dimensions in the respective compartments 17 and 44. It will be appreciated that such spacer devices may be included on two orthogonal sides of the holder to provide for variable spacing in both the lateral and fore/aft dimensions. It will be appreciated by those skilled in the art that the holder shown in FIG. 4 operates substantially the same as that shown in FIGS. 1 through 3 except that the spacers 69 and 71 are added or removed, as the case may be, to complement the lateral dimension of the particular cavity 17 or 40 into which the holder is to be mounted.

From the foregoing, it will be appreciated that the beverage container holder of the present invention is relatively sturdy in construction, convenient to use and provides a highly stable platform for mounting of a beverage container.

What is claimed is:

1. A beverage container holder adapted for selectively mounting in an organizational or storage compartment of an automobile having opposite planar compartment walls forming a generally rectangular in horizontal cross section interior compartment of a predetermined width, such holder comprising:

a vertical stem having a generally rectangular horizontal cross section and a width adapted to correspond with said predetermined width for friction fit in said compartment;

a body formed integral with said stem and configured coextensively with the top of said stem and projecting laterally outwardly therefrom over a respective said compartment wall, said body being configured with an upwardly opening beverage holder receiving cavity;

said stem having a planar wall for abutting one said compartment wall of said compartment; and said body further being formed with a downwardly facing stabilizing wall angling upwardly and forwardly from said stem.

2. The holder as set forth in claim 1 wherein:
   said stem device includes rectangular spacer elements removably connected together to cooperate in forming said stem device.

3. The holder as set forth in claim 1 wherein:
   said cavity is cylindrically shaped and formed with flexible vertical ribs disposed thereabout to flex upon receipt of an oversized said beverage container.

4. The holder as set forth in claim 1 wherein:
   said stem is formed with a bottom end angling laterally outwardly and upwardly relative to a vertical axis that extends through said upwardly opening beverage holder receiving cavity.

5. The holder as set forth in claim 1 wherein:
   said body and stem is constructed of compressible foam.

6. The holder as set forth in claim 1 wherein:
   said body and stem are constructed of thermoplastic foam.

7. The holder as set forth in claim 1 wherein:
   said body is formed with a bottom side configured with a hanger having a downwardly opening groove.

8. The holder as set forth in claim 1 for mounting in said compartment having a bottom wall oriented at a predetermined angle to the horizontal wherein:
   said stem is of a sufficient length to project downwardly in said compartment and is formed with a bottom wall projecting at said predetermined angle to the horizontal.

9. The holder as set forth in claim 1 for selectively mounting in an upwardly opening vertical automobile interior door pocket wherein:

said stem is constructed with a transverse dimension corresponding with the width of said door pocket.

10. A beverage container holder adapted for selectively mounting in a pocket forming an interior compartment of an automobile and having a first wall and a second wall spaced inwardly from the first wall at a predetermined width, such holder comprising:

a vertical stem device having a rectangular horizontal cross section with a width adapted to correspond with said predetermined width for friction fit in said compartment;

a body formed in one piece with, and disposed on top of, said stem and adapted to project laterally inwardly therefrom over said second wall and configured with an upwardly opening beverage holder receiving cavity;

said stem device having a planar wall for abutting said first wall of said compartment; and stabilizing means for stabilizing said body against rocking forwardly and rearwardly.

11. The holder as set forth in claim 10 for mounting from said compartment formed with a side wall terminating in a top edge wherein:

said body is formed with a bottom side configured with a hanger having a downwardly opening groove for receipt of said top edge.

12. The holder as set forth in claim 10 for selective receipt in an automobile console cavity projecting downwardly and forwardly at a predetermined angle and formed with a rectangular transverse cross section and for selective receipt in an elongated upwardly opening door pocket having a predetermined width wherein:

said stem is rectangular in cross section, configured with a thickness corresponding to said predetermined width and is configured in the perpendicular plane to angle downwardly and forwardly at said predetermined angle.

13. The holder as set forth in claim 10 wherein:

said body includes flexible means lining said cavity to flex under the force of a beverage container to vary the transverse cross section thereof to accept different cross section said containers.

14. The holder as set forth in claim 10 wherein:

said body is block shaped.

15. The holder as set forth in claim 10 wherein:

said body is formed on one side with a flat linear surface for abutting one wall of said compartment.

16. The holder as set forth in claim 10 wherein:

said body is formed on one side with a planar surface aligned with one corresponding planar side of said stem.

17. The holder as set forth in claim 10 for use with the compartment having a predetermined lateral dimension wherein:

said stem is formed of compressible foam and is constructed with the distance between said planar sides, when said foam is expanded, greater than said predetermined lateral dimension.

18. The beverage container holder as set forth in claim 10 wherein:

such stabilizing means includes such stem being formed with a planar bottom for, when such stem is received in such interior compartment, abutting the bottom wall of such compartment.

19. The beverage container holder as set forth in claim 10 wherein:

such stabilizing means includes such body being formed with a downwardly facing stabilizing wall for, when such stem is received in such interior compartment, contacting the top edge of one such compartment wall to provide support against forward and rearward rocking.

20. The beverage container holder as set forth in claim 10 wherein:

such horizontal cross section of such stem is at least 6.5 cm wide.

21. A beverage container holder adapted for selectively mounting in a door compartment in the interior of an automobile and having a first wall and a second wall spaced inwardly from the first wall at a predetermined width, such holder comprising:

a vertical stem device having a rectangular horizontal cross section and a width adapted to correspond with said predetermined width for friction fit in said compartment;

a body formed on top of said stem and adapted to project laterally inwardly therefrom over said second wall and configured with an upwardly opening beverage holder receiving cavity;

said stem device having a planar wall for abutting said first wall of said compartment; and said body further being formed with a downwardly facing stabilizing wall angling upwardly and forwardly.

* * * * *